United States Patent [19]
Terry

[11] Patent Number: 6,061,356
[45] Date of Patent: May 9, 2000

[54] METHOD AND APPARATUS FOR SWITCHING ROUTABLE FRAMES BETWEEN DISPARATE MEDIA

[75] Inventor: Philip Frank Terry, Simi Valley, Calif.

[73] Assignee: Alcatel Internetworking, Inc., Calabasas, Calif.

[21] Appl. No.: 08/756,284

[22] Filed: Nov. 25, 1996

[51] Int. Cl.$^7$ .......................... H04L 12/413; H04L 12/56
[52] U.S. Cl. .......................... 370/401; 370/445; 370/466
[58] Field of Search ................................ 370/466, 467, 370/351, 401, 445

[56] References Cited

U.S. PATENT DOCUMENTS

| | | | |
|---|---|---|---|
| 5,048,014 | 9/1991 | Fischer | 370/258 |
| 5,086,426 | 2/1992 | Tsukakoshi et al. | 370/405 |
| 5,732,071 | 3/1998 | Saito et al. | 370/255 |
| 5,809,028 | 9/1998 | Nethercott et al. | 370/467 |

*Primary Examiner*—Huy D. Vu
*Assistant Examiner*—Jasper Kwoh
*Attorney, Agent, or Firm*—Scot A. Reader, Esq.

[57] ABSTRACT

A method and apparatus for switching/bridging frames between a heterogeneous media is disclosed. Bridges and/or switches normally bit-swap a MAC header of a frame when switching the frame between heterogeneous media. However, this practice introduces errors in address formats in certain situations. Such problems are resolved by investigating whether a frame to be switched includes local address components, and if so, these address components in the frame are manipulated to ensure that the address formats are proper for a media onto which the frame is being switched.

30 Claims, 15 Drawing Sheets

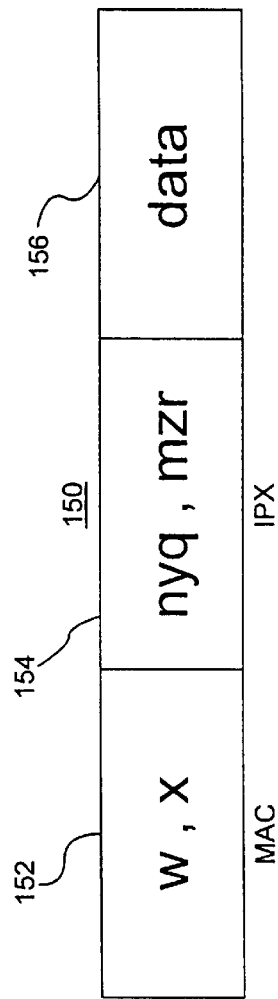
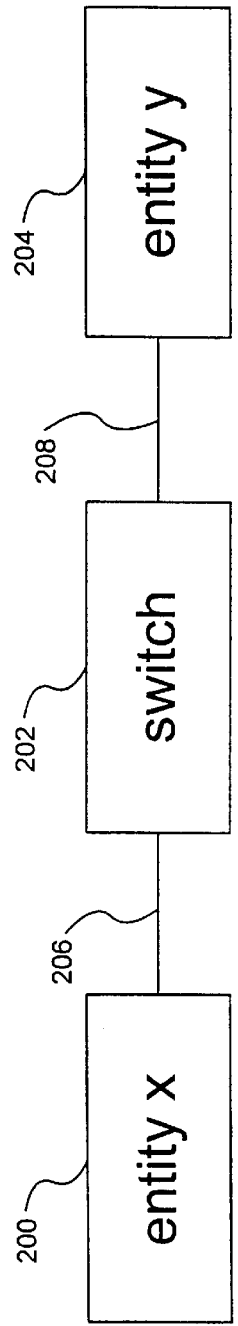

| | | | 1200 |
|---|---|---|---|
| MAC Header | IP Header | UDP Header | DHCP Message |
| Destination/ Source MAC Address | IP Protocol Data | Destination Socket ID | Client ID |
| 1202 | 1204 | 1206 | 1208 |

Figure 12A

| | | 1250 | |
|---|---|---|---|
| D, S | DEST, SRC | SN | CHADDR |
| 1252 | 1254 | 1256 | 1258 |

Figure 12B

METHOD AND APPARATUS FOR SWITCHING ROUTABLE FRAMES BETWEEN DISPARATE MEDIA

BACKGROUND OF THE INVENTION

The present invention relates generally to computer networking and more particularly to the internetworking requirements of Network layer protocols when switching or bridging frames between computer networks operating according to different Data Link layer protocols.

Computer communication models, such as the International Standards Organization (ISO) Open Systems Interconnection (OSI) model and the Institute of Electrical and Electronic Engineers (IEEE) model are known. The OSI model is a seven layer model that assumes an internetwork comprising a set of stations connected by physical media. A first, or "Physical" layer of the OSI model is concerned with the physical properties of the various media which can be used to directly connect stations. For example, media can be implemented on a point-to-point physical link connecting only two stations, or media can be implemented on a common link shared by many stations. A second, or "Data Link" layer of the model is concerned with how stations communicating on a physical link cooperate so as to efficiently and fairly use the bandwidth of that physical link. A third, or "Network" layer of the model is concerned with stations not directly connected by a common physical link. These "end-stations" communicate using intervening stations and intervening physical links which relay data between the endstations. The protocols at this Network layer are often referred to as "routing" protocols.

The OSI model does not require one-to-one correspondence between the communicating entities and the physical stations which make up the internetwork. These and other aspects are dealt with in the four remaining layers of the model: the Transport layer, the Session layer, the Presentation layer and the Application layer.

Ideally, in building an internetwork, an implementation of all tasks addressed by the various layers of the OSI model is provided. In practice, however, the size of the network (both geographically and number of stations) and the quality of service required (i.e., reliability, throughput, and so forth) can result in many internetworking issues being ignored or addressed by only marginal proprietary implementations. For example, if all of the end-stations in the internetwork can communicate on a common physical link which provides shared access to those stations, there is no need to implement a Network layer because the protocols of the Data Link layer are sufficient. This "shared access" model is implemented, for example, on a single Local Area Network (LAN) segment.

Thus, in practice, networks are built by taking LANs and WANs governed by different standards and combining them into internetworks using proprietary protocols and techniques. While these proprietary internetwork implementations can be described and analyzed according to the OSI model, they are not necessarily implementations of OSI protocol standards. Thus, proprietary protocol implementations may not be capable of interworking with each other. Still, so long as the proprietary techniques observe certain underlying standards common to LANs and WANs, they can coexist as distinct logical networks sharing a physical network infrastructure.

Some important LAN standards have been provided by the IEEE LAN 802 committees. The IEEE provides standards for LANs which divide the Physical and Data Link layers of the OSI model into two sub-layers. The sub-layers includes a media dependent Media Access Control (MAC) layer and a media independent Logical Link Control (LLC) layer. The MAC layer, or MAC protocol is media-specific and governs how directly connected stations access and share physical media. The LLC layer defines the format of the frames carried on the media. These IEEE 802 LAN committees have implemented standards for various physical media, such as CSMA/CD (IEEE 802.3) and Token ring (IEEE 802.5).

Other governing bodies have set forth LAN standards for other media. For example, the American National Standards Institute has implemented the ASNI X3T9.5 standards for communication utilizing Fiber Distributed Data Interface (FDDI) as the communication media.

Similarly, Wide Area Network (WAN) technologies are governed by standards bodies under the umbrella of the International Telecommunications Union (ITU). In many cases, the physical media underlying WANs are specified to use frame formats defined by ISO/IEEE for LANs.

The proliferation of different LAN and WAN standards and proprietary internetworking techniques has led to internetworking complications. One internetworking complication has arisen in the context of switching or bridging between disparate media. In forwarding frames between different media, a switch or bridge must often modify the frames to observe the IEEE standards for the underlying Physical and Data Link layer protocol of the media onto which a frame is being transferred. This modification involves changing the bit ordering of, i.e., "bitswapping", certain MAC fields contained in the frame. However, when these alterations of MAC fields are made independent of the Network layer address fields in the frame, the frame is susceptible to violating the expectations of the destination Network layer station regarding the bit ordering relationship between those fields, and the frame may not be recognized by the station.

More particularly, certain proprietary Network layer protocols dictate a particular relationship between the bit ordering of the MAC and Network address fields of a frame. However, encoding of addresses in the MAC header is dictated by LAN standards as well as these proprietary Network layer protocols. Thus, implementation of LAN standards by a switch or a bridge may lead to a frame being encoded in a way which violates the expectations of a proprietary Network layer standard. For instance, Novell's proprietary IPX Network layer protocol has a requirement for the bit ordering of addresses in the MAC and IPX headers which is not always observed by LAN standards when implemented in a mixed media environment. This has rendered switching and bridging of IPX frames between disparate media, such as between Token ring and FDDI or between Token ring and CSMA/CD, unworkable.

The need for a solution to the problem of violating expectations is particularly acute because of raised expectations of switch users with the introduction of technology such as Virtual LANs (VLANs). VLANs encourage a view where the physical topology and media is hidden in preference to the logical structure and use of the network by its end-users. Having been encouraged to view their networks in this way, users do not want to be informed that station X cannot communicate with station Y because station X is on a Token ring.

The problem can be generalized to all situations in which a frame may be subjected to inconsistent or overlapping standards and proprietary specifications imposed at the Data Link and Network layers of the OSI model. Accordingly, it would be desirable to find a solution that simply and efficiently recognizes frames that are susceptible to violating the expectations of a Network layer protocol and that applies an appropriate correction. It would be further desirable to provide such a solution without imposing undue latency in transferring frames.

SUMMARY OF THE INVENTION

The present invention is directed to efficiently identifying and correcting frame errors introduced by an intermediate Data Link layer relay station operating between two Network layer end-stations.

In accordance with the invention, a switch or bridge is used to relay frames between Network layer stations on disparate media. A frame is received by the switch or bridge. The switch or bridge determines whether the received frame has components about which the station might make Network layer assumptions. The switch or bridge then determines whether the assumptions will be violated. If they will be, the components are modified to place the components in compliance with the requirements of the Network layer protocol for the media onto which the frame is being relayed.

Wherein frames are switched between a first media and a second media, an exemplary method comprises the steps of: receiving a frame; determining whether the received frame has "local" frame components; and formatting those components in accordance with requirements of a media onto which the frame is being relayed. An exemplary apparatus for switching or bridging frames between a first media and a second media comprises: means for receiving a frame; means for determining whether the received frame has local components; and means for formatting the local components in accordance with requirements of a media onto which the frame is being relayed.

BRIEF DESCRIPTION OF THE DRAWINGS

The present invention can be further understood with reference to the following description and the appended drawings, wherein:

FIG. 1A shows the contents of a typical IPX frame;

FIG. 1B shows the arrangement of information in an IPX frame;

FIG. 2 shows an exemplary switching arrangement involving two communicating entities;

FIG. 12A shows the contents of a typical DHCP frame;

FIG. 12B shows the arrangement of information in a DHCP frame;

DETAILED DESCRIPTION OF THE PREFERRED EMBODIMENTS

Figure 3A:
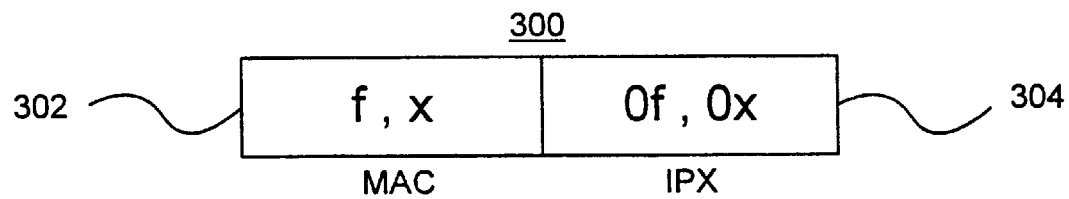
FIGS. 3A through 3D show a succession of frames between an Ethernet client and a FDDI server for a SAP request/reply scenario in the FIG. 2 arrangement.

Referring to FIG. 1A, the IPX protocol is built around a frame 100 that includes a MAC header 102. The format, content and encoding of this header is subject to the LAN standard appropriate to the medium on which the frame is to be transmitted or received. The header 102 comprises at least a source and destination MAC address whose format and encoding is subject to the appropriate LAN standard.

The rest of the frame can be divided into an IPX header 104 and a data portion 106. The format, content and encoding of the IPX header 104 and data portion 106 are subject to specifications set forth by Novell. The IPX header 104 is the field containing IPX protocol data which corresponds to the Network layer concerned with internetworking. The IPX header 104 includes destination and source station identifiers as well as task identifiers.

FIG. 1B shows the details of address fields 150 in an IPX frame 100. In the MAC header 152 there is a destination address w, and a source address x. In the IPX header 154, the destination entity address includes a network number n, a station or node address y, and a task or socket identifier q. Similarly the source entity address includes a network number m, node z and socket identifier r. Node addresses in the IPX header 154, such as y and z, are defined to be 48-bit MAC addresses. The MAC header field, in many circumstances, is dependent on the MAC addresses in an IPX header 154. IEEE 802.3, the standard concerned with CSMA/CD LANs, dictates that 8-bit octets of a MAC address field be transmitted least significant bit first. This is called "canonical ordering". IEEE 802.5, the standard concerned with Token ring, and ASNI X3T9.5, the standard concerned with FDDI, dictate that the 8-bit octets of a MAC address field be transmitted most significant bit first. This is called "noncanonical ordering". For purposes of the following discussion, frame contents indicated in upper-case characters represent a noncanonical bit order (i.e., most significant bit first) while frame contents indicated in lower-case characters represent a canonical bit order (i.e., least significant bit first).

The impact of the foregoing standards is that a MAC address, as stored in the memory of a station, has two representations so that the address, when transmitted on a particular media type is correct for that particular media type. These two representations can be mapped by reversing the order of bits within the octet storage in an operation called bit-swapping.

Novell's IPX specifications also dictate a bit order for MAC addresses of stations on the same LAN when such addresses are stored in the fields of an IPX header or data field. The encoding to be included in an IPX header, as defined by Novell, is dependent on the physical media on which the frame is to be transmitted or received. In the IPX header portion of a frame to be transmitted or received on IEEE 802.3 CSMA/CD or ASNI X3T9.5 FDDI LANs, Novell IPX dictates that the address be encoded canonically. In the IPX header portion of a frame to be transmitted on IEEE 802.5 Token ring LANs, Novell IPX dictates that the address be encoded noncanonically.

Taken together, the LAN standards and the Novell IPX specifications dictate that a Network layer station implementing Novell's IPX protocol can have the following expectations of media addresses of local stations encoded in received frames, and similarly will generate frames which conform to these expectations (although these expectations do not apply to all frames on the media at all times):

On IEEE 802.3 CSMA/CD, media addresses are canonical in both MAC and IPX header fields.

On IEEE 802.5 Token ring, media addresses are noncanonical in both MAC and IPX header fields.

Figure 8:
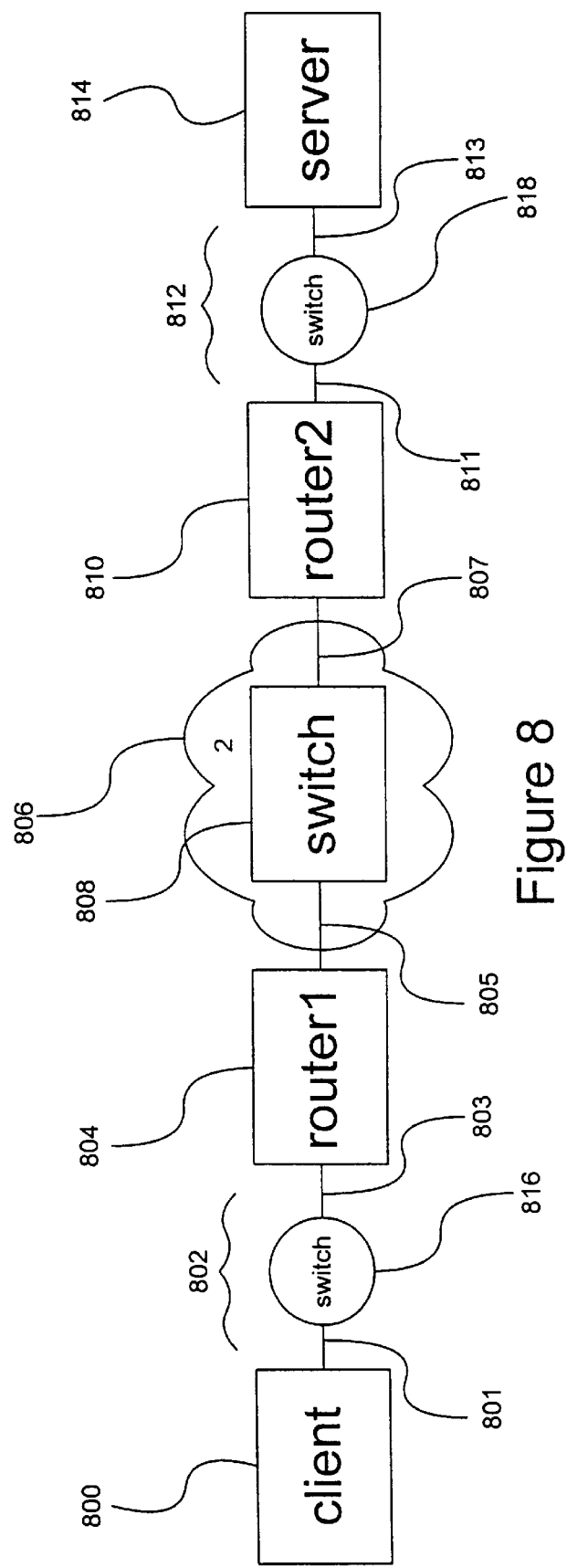
FIG. 8 shows an arrangement wherein a client communicates with a server by a series of routers.

On ANSI X3T9.5 CSMA/CD FDDI, media addresses are noncanonical in a MAC header and canonical in an IPX header. To better illustrate the significance of the foregoing expectations, FIG. 8 shows an exemplary arrangement having an IPX client 800, IPX server 814, and intermediary IPX routers 804 and 810, in a network where the physical links are formed by LAN media which are extended by switch/bridges. This network example will be used as the basis of exchanges which occur in the IPX protocols to show how the expectations of an IPX station implementation and the MAC modifications of a switch/bridge observing the IEEE LAN standards interact to produce situations where stations fail to interwork. Several of the examples provided below illustrate situations where problems do not occur in order to provide a better premise from which to appreciate the problems that can occur.

The client 800 and router 804 are connected on an extended LAN 802 formed of media links 801 and 803 with a switch/bridge 816. The server 814 and router 810 are connected on an extended LAN 812 formed by media links 811 and 813 with a switch/bridge 818.

Router 804 and router 810 are connected by an arbitrary internet 806. Without loss of generality this can be represented at minimum by the media links 805 and 807 and a switch/bridge 808. Routers 804 and 810 are adjacent routers which share a single intermediate network.

A fundamental aspect of routing is that a frame is not addressed to its destination at the MAC level. At the MAC level, a frame is addressed to a router that can get the frame "closer" to its final destination. A router has at least two interfaces, or ports, each one being on a different LAN. Each of the LANs are given a globally unique identifier in the form of a network number. The network number is added to the source and destination node addresses in the IPX header. In IPX, routers announce their presence to each other by broadcasting Routing Information Protocol (RIP) frames onto each of the LANs to which they are connected. Using these RIP frames, routers inform adjacent routers as to which network segments they can communicate with over their various ports. By configuration, a router initially knows only the network numbers of each of the LANs attached to its ports. As the router receives RIP frames from other routers it builds up a routing or RIP table, augmenting its initially configured information. As the router builds its own table, it broadcasts RIP frames informing other routers of the augmented information. In this fashion, all routers in the system build a complete picture of the network in terms of which networks are reachable by each of its own ports.

Somewhat related to IPX RIP is the IPX Service Advertising Protocol (SAP). The SAP protocol allows file servers, print servers, gateway servers, and the like, to advertise their services and addresses to the network. SAP makes the process of internetworking dynamic by allowing a server to announce its addition or removal from the network. SAP tables are constructed by servers and routers in an analogous manner to RIP. When a client wishes to use a service, access files, print, or the like, it can broadcast a SAP request for the service. The routers or servers on its LAN can respond with the network number, node, and socket of a station offering that service by consulting their SAP tables. The client, now knowing the full identity of the desired destination station, can use a RIP request to find a router MAC address to convey its data to the service provider. If the client and server reside on the same LAN they don't need an intermediate router to communicate. In such a case, the MAC address returned in the RIP reply will be that of the server, not an intermediate router.

Rather than configure every client station with its network number, as is done for servers and routers, clients can discover their network number dynamically via the SAP and RIP protocols. In the request for a service, a client can use 0 as the network number in IPX headers of the frames it generates. Similarly, when making the RIP request it can use 0 as its network number. In the reply to the RIP request, a router or server replying to the request inserts an appropriate network number. The client can then use this to determine its network number and use it in all subsequent communication.

From this brief overview of Novell's IPX protocol it can be seen that exemplary exchanges which require examination of the impact of media switching/bridging include: RIP exchanges between routers, by which the network topology is established; SAP exchanges between servers and routers, by which the established topology is populated with services; RIP and SAP exchanges between clients and router/servers, by which the client interrogates the topology and services; and end to end protocol exchanges between clients and servers, which may be direct on a local LAN or routed indirectly.

In all of the above exchanges, except indirectly routed frames, a relationship between MAC header addresses and IPX header node addresses is expected. This is because in all of these cases the source and destination communicating entities are local to the LAN in question. For indirectly routed frames, such as a client to server frame in FIG. 8, the expectations will apply to some degree dependent on which intermediate link is under consideration.

For example, in a frame transmitted from the client 800 to the server 814 on the LAN 802, between the client 800 and router 804 there would be an expected relationship for the source address encoded in the MAC and IPX headers but no expected relationship for the destination addresses. This source address dependency arises because the frame is on the same LAN as the source communicating entity. Thus the source components are "local" to the LAN. After being processed by router 804 and transmitted onto LAN 806 to router 810 there is no expected relationship between any of the addresses. This is because neither the source or destination communicating entity are local to LAN 806. After being processed by router 810 and transmitted onto LAN 812 to the server 814, a relationship between the destination addresses will be expected, but not for the sources. This dependency arises because the destination communicating entity is local to LAN 812.

Given this notion of local entities having an expectation of a relationship between MAC and IPX header addresses, the impact of mixed media switching/bridging can be examined in terms of the entities shown in FIG. 2. The basic premise of the FIG. 2 illustration is that a first network element 200, observing the standards governing one LAN media 206, communicates with a second network element 204, observing the standards for a second LAN media 208, where an intermediate switch/bridge device 202 is performing LAN transformations unknown to the first and second network elements. Obviously, where 206 and 208 are using a common LAN media, no modification of the frame is required of the switch/bridge at the MAC level, and there can be no disturbance of any expected relationship of the MAC and IPX header addresses. However, in the mixed media case, MAC level modifications to the bit order performed by the switch/bridge in accordance with LAN standards may render a frame susceptible to violating an expected relationship between the addresses stored in the MAC and IPX headers.

Where link 206 is IEEE 802.3 CSMA/CD and link 208 is ASNI XT9.5 FDDI, the LAN standards require switch/bridge 202 to bit-swap the MAC header source and destination addresses. No modification is required by LAN standards of the IPX header. This results in a change in the relationship of the MAC and IPX header addresses. On link 206 the entity 200 produces a frame according to Novell IPX requirements where the addresses at both levels are canonical. The switch/bridge 202 modifies the frame on link 208 such that addresses are noncanonical at the MAC level, leaving the original canonical addresses at the IPX level. This relationship is exactly that expected by Novell IPX for a frame on FDDI media. As such, expectations of entity 204 are met, and problems do not arise.

Where link 206 is IEEE 802.3 CSMA/CD and link 208 is IEEE 802.5 Token ring, the switch/bridge 202 is required to bit swap the MAC header source and destination addresses. No modification is required by LAN standards of the IPX header. This results in a change in the relationship of the MAC and IPX header addresses. On link 206 the entity 200 produces a frame according to Novell IPX requirements where the addresses at both levels are canonical. The switch/bridge 202 modifies the frame on link 208 such that addresses are noncanonical at the MAC level leaving the original canonical addresses at the IPX level. This relationship is not that expected by Novell IPX for a frame on Token ring media where both addresses are expected to be noncanonical. As such, the expectations of entity 204 are not met, and problems arise.

Where link 206 is IEEE 802.5 Token ring and link 208 is ASNI XT9.5 FDDI, the switch/bridge 202 is not required to bit swap the MAC header source and destination addresses. No modification is required by LAN standards of the IPX header. This results in no change in the relationship of the MAC and IPX header addresses. On link 206 the entity 200 produces a frame according to Novell IPX requirements where the addresses at both levels are noncanonical. The switch/bridge 202 does not modify the frame on link 208 such that addresses remain noncanonical at both levels. This relationship is not that expected by Novell IPX for a frame on FDDI media. As such, the expectations of entity 204 are not met and problems arise.

Where link 206 is ASNI XT9.5 FDDI and link 208 is IEEE 802.3 CSMA/CD, the switch/bridge 202 is required to bit swap the MAC header source and destination addresses. No modification is required by LAN standards of the IPX header. This results in a change in the relationship of the MAC and IPX header addresses. On link 206 the entity 200 produces a frame according to Novell IPX requirements where the addresses in the MAC header are noncanonical and canonical in the IPX header. The switch/bridge 202 modifies the frame on link 208 such that addresses are canonical at the MAC level leaving the original canonical addresses at the IPX level. This relationship is that expected by Novell IPX for a frame on a CSMA/CD media. As such, the expectations of entity 204 are met, and problems do not arise.

Where link 206 is IEEE 802.5 Token ring and link 208 is IEEE 802.3 CSMA/CD, the switch/bridge 202 is required to bit swap the MAC header source and destination addresses. No modification is required by LAN standards of the IPX header. This results in a change in the relationship of the MAC and IPX header addresses. On link 206 the entity 200 produces a frame according to Novell IPX requirements where the addresses at both levels are noncanonical. The switch bridge 202 modifies the frame on link 208 such that addresses are canonical at the MAC level leaving the original noncanonical addresses at the IPX level. This relationship is not that expected by Novell IPX for a frame on CSMA/CD media where both addresses are expected to be canonical. As such, the expectations of entity 204 are not met, and problems arise.

Where link 206 is ANSI XT9.5 FDDI and link 208 is IEEE 802.5 Token ring, the switch/bridge 202 is not required to bit-swap the MAC header source and destination addresses. No modification is required by LAN standards of the IPX header. This results in no change in the relationship of the MAC and IPX header addresses. On 206 the entity 200 produces a frame according to Novell IPX requirements where the addresses at the MAC level is noncanonical and canonical at the IPX level. The switch/bridge 202 does not modify the frame on link 208 such that this relationship remains. This relationship is not that expected by Novell IPX for a frame on Token ring media. As such, the expectations of entity 204 are not met and problems arise.

Several additional examples are provided below to further illustrate situations wherein switching of frames carrying local address fields can present problems in IPX scenarios. Several of the examples given set out situations where the problems do not arise in order to provide a better premise from which to understand the examples wherein problems do occur. The examples presented below correspond to a first network element observing the implementation rules for one media, which first network element is communicating with a second network element, wherein the second network element is implementing rules for another media. An intermediate switching device is involved, which is unknown to the first and second network elements.

In FIG. 2, entity 200 has an address x that can communicate with entity 204 having an address y. The entity 200 can be a client in a CSMA/CD environment such as at Ethernet segment, while entity 204 can be a server on a FDDI ring. That is, the first media segment 206 is Ethernet and the second media segment 208 is FDDI, and the switch 202 translates frames between the Ethernet and FDDI media.

FIGS. 3A through 3D illustrate frame contents at various points in the process of the Ethernet client 200 issuing a SAP request frame that is replied to by the FDDI server 204. To simplify the discussion, frame contents such as data are omitted. The frame 300 depicted in FIG. 3A is an exemplary frame sent out by the Ethernet client 200 in the context of an Ethernet get nearest_server SAP request. The frame 300 includes a canonical MAC header 302 having a broadcast address f (i.e., sent over all local segments) and a source address x of the Ethernet client 200. A canonical IPX header 304 includes a destination network number 0 and a destination node f. The IPX header 304 also includes a source network number 0, and a source node address x corresponding to the Ethernet client 200.

Figure 3B:
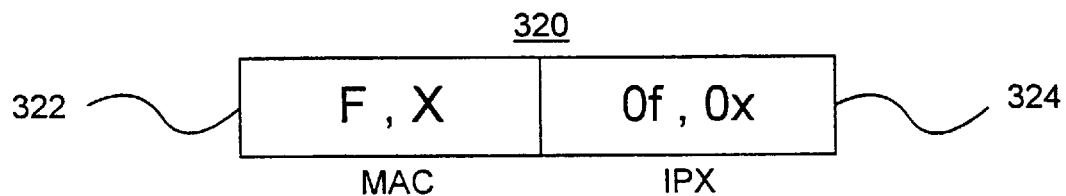
Figure 3C:
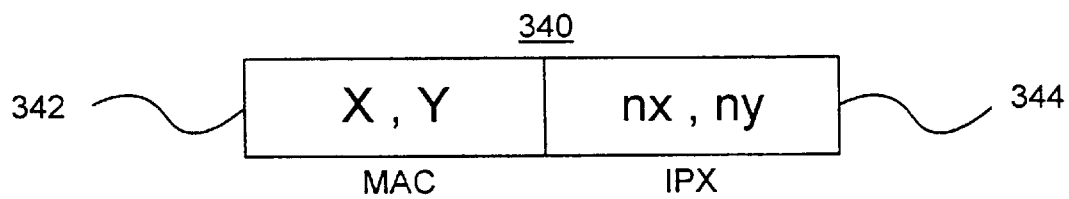

When the frame 300 is switched onto an FDDI media by the switch 202, the contents of the MAC header are bit-swapped in accordance with LAN standards to produce a frame 320 of FIG. 3B. Accordingly, the frame 320 contains a MAC header 302 having a noncanonical representation of the broadcast address F (the destination address) and a noncanonical representation of the source address X of the Ethernet client 200. The IPX header 304 is not altered under LAN switching rules. The FDDI server 204 recognizes the get_nearest_server request frame and responds by generating a FDDI nearest_server reply frame 340 shown in FIG. 3C. In a FDDI environment, a reply frame is constructed according to the following rules:

1. Insert own address in canonical form (e.g., server 204 address y) in the source node address field of the IPX header.
2. Insert own address in noncanonical form (e.g., server 204 address u) in the source address field of the MAC header.
3. Insert source node address from incoming request IPX header into destination node address field of reply IPX header (e.g., client 200 address x), without alteration.
4. Insert source node address from incoming request IPX header into destination address field of reply MAC header (e.g., client 200 address x), which in a FDDI implementation is bit-swapped. Hence, X, not x, is inserted in the present example.

The nearest_server reply frame 340 generated by the FDDI server 204 in response to the FDDI get_nearest_server request frame 320 includes a noncanonical MAC header 342 and a canonical IPX header 344. In accordance with the FDDI reply frame construction rules, the noncanonical MAC header 342 destination address, X, is derived from the source node address of the IPX header 320, while a noncanonical source address Y is inserted by the sever 204 to inform the client 200 of the FDDI server's address. In the IPX header 344, the canonical node address, x, is derived from the source node address, x, of the IPX header 324. The IPX header 344 source node address, y, communicates the node address of the server 204 back to the requester. The FDDI server 204 inserts a network number, n, in both the source and destination network number components of the IPX header 344 which is the network number assigned to the server 204 during its configuration. The frame 340 is returned on the FDDI ring to be switched back onto the media from which the request originated.

Figure 3D:
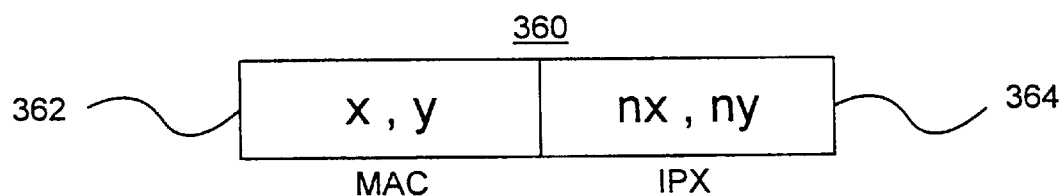
Figure 4A:
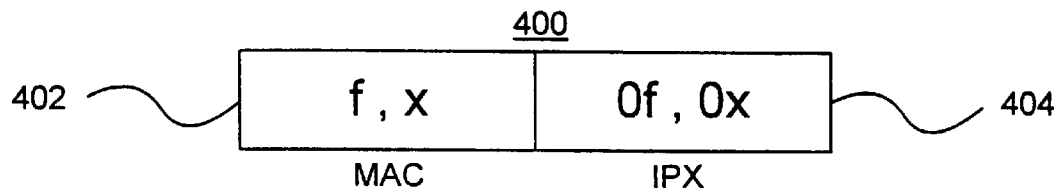
FIGS. 4A through 4D show a succession of frames between an Ethernet client and a Token ring server for a SAP request/reply scenario in the FIG. 2 arrangement.
Figure 4B:
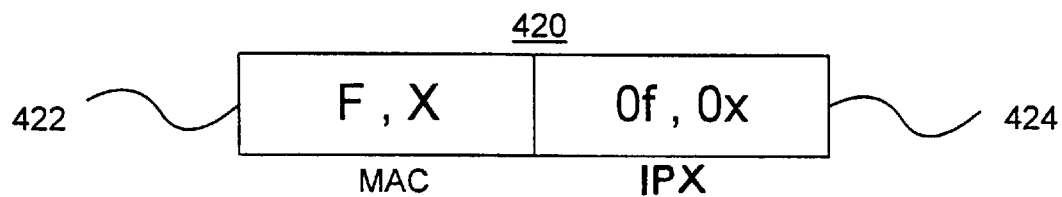
Figure 4C:
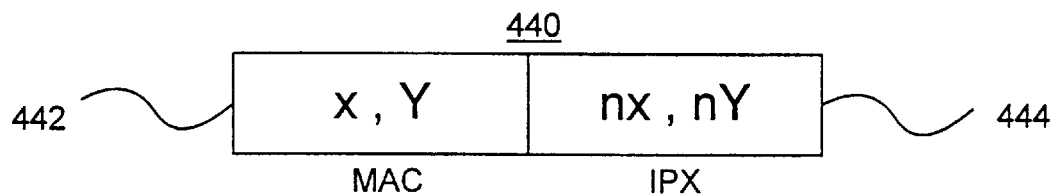
Figure 4D:
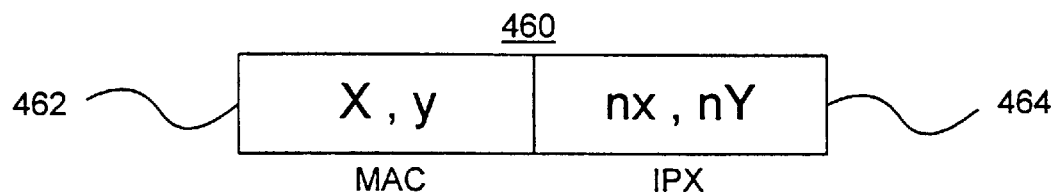

The FDDI nearest_server reply frame 340 is switched onto the Ethernet media segment 206 to produce an Ethernet nearest_server reply frame 360, shown in FIG. 3D, that is presented to the Ethernet client 200. In accordance with LAN switching rules, the MAC header 342 is bit-swapped while the IPX header 344 is unaltered. That is, frame 360 includes a canonical MAC header 362 having a destination address, x, and a source address y (a canonical version of the source address of the FDDI server 204). This frame does not present any problems because the canonical destination address x in the MAC header 362 is recognized by the client 200.

FIGS. 4A through 4D illustrate a similar case where the same Ethernet client 200 is sending the same SAP request frame to a server 204 on a Token ring (i.e., the second media 208 is a Token ring). When frame 400 is switched onto the Token ring media 208, the frame 400 is translated in accordance with the LAN switching rules (i.e., bit-swap the MAC header) to produce a Token ring get_nearest_server frame 420 that is presented to the server 204. After being switched, the frame 420 includes a noncanonical MAC header 422 having a broadcast address F (the destination address), and a noncanonical source address X (i.e., the noncanonical representation of the source address of the Ethernet client 200). The IPX header 424 is unchanged.

A Token ring entity constructs reply frames in accordance with the following rules:

1. Insert own address in noncanonical form (e.g., server 204 address y) in the source node address of the IPX header.
2. Insert own address in noncanonical form (e.g., server 204 address y) in the source address field of the MAC header.
3. Insert source node address from incoming request IPX header into destination node address of reply IPX header (e.g., client 200 address x) without alteration.
4. Insert source node address from incoming request IPX header into destination address field of reply MAC header (e.g., client 200 address x), which in a Token ring implementation is not bit-swapped. Hence, x, not X, is inserted in the present example.

In accordance with these rules, the nearest server reply frame 440 generated by the Token ring server 204 in response to the request frame 420 (see FIG. 4C) has a mixed header. That is, in accordance with the Token ring reply rules, the MAC header 442 destination address, x, derived from the source node address of the Token ring IPX header 424, is canonical, while the MAC header 442 has a noncanonical source address Y. The IPX header 444 also has a mixed format wherein the destination node address, x, is derived from the source node address of the IPX header 424. The source node address, Y, for the server 204, is given in noncanonical form in accordance with the Token ring reply rules.

When switched back to the Ethernet media 206, the MAC header of frame 460 is bit-swapped in accordance with LAN switching rules, thereby producing an Ethernet nearest_server reply frame 460 that consists of a MAC header 462 having noncanonical destination address X and a canonical source address y. The IPX header 464 for the Ethernet nearest_server reply frame is unchanged. Frame 460, however, fails to reach the client 200 because the MAC header destination address is in noncanonical form, i.e., X, which address format is unknown to the Ethernet client 200. A similar problem occurs when a FDDI client issues a SAP frame that is switched onto and returned from a Token ring media. A similar problem can occur with respect to RIP frames switched and returned over mixed media.

Figure 5:
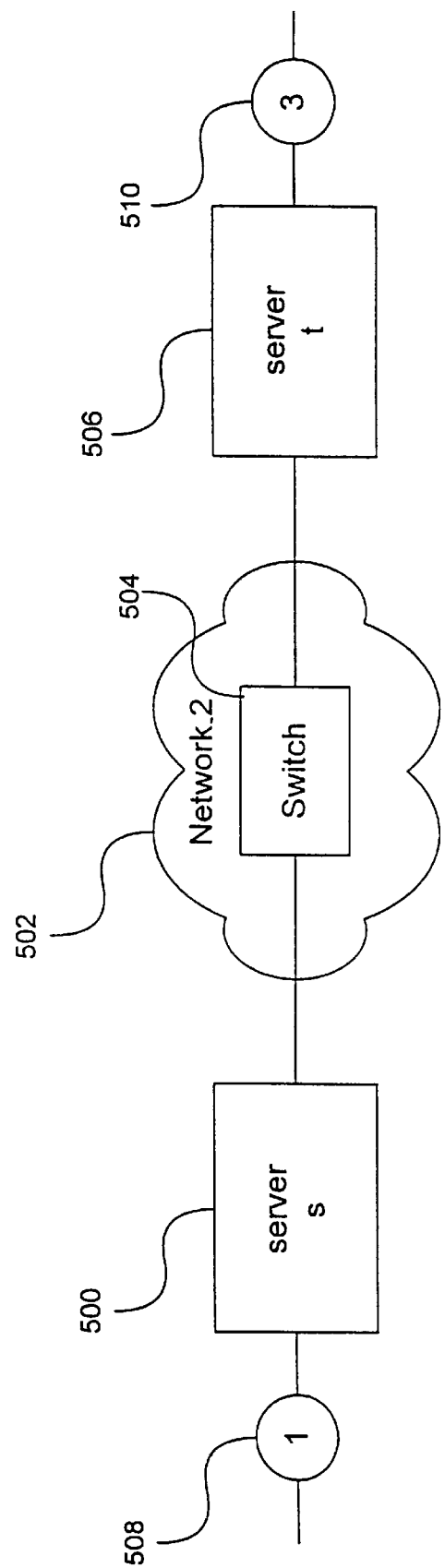
FIG. 5 shows another exemplary switching arrangement involving servers communicating by a switch.
Figure 6A:
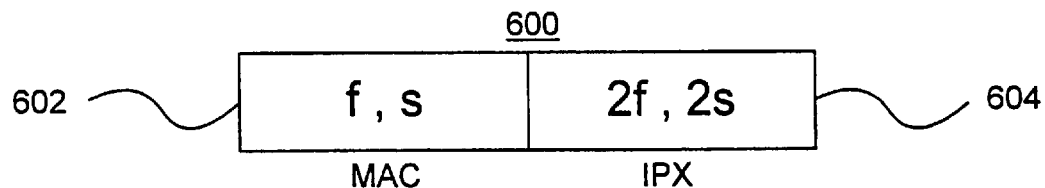
FIGS. 6A through 6D show a succession of frames between an Ethernet client and a FDDI server in a RIP scenario in the FIG. 5 arrangement.

FIG. 5 depicts a network scenario wherein a server 500 having an address s, is switched onto a server 506 having an address t, via switch 504 over a network 502. The server 500 also is connected to network 508 while server 506 also is connected to network 510. Where server 500 is an Ethernet server and server 506 is a FDDI server, FIGS. 6A through 6D represent a RIP scenario wherein the Ethernet server 500 advertises network 508 to the FDDI server 506 which builds a RIP table entry based on the RIP information. The FDDI server 506 subsequently forwards a message to server 500 based on the RIP table entry. Referring to FIG. 6A, server 500 generates an advertise_network_1RIP request frame 600 onto the network 502 (believing network 502 to be Ethernet) which advertises network 508 (i.e., network_1). The frame 600 is switched (by switch 504) over network 502 to server 506. The frame 600 includes a canonical MAC header 602 having broadcast address f (i.e., send over all local links) and a source address s (the address for server 500). A canonical IPX header 604 for the Ethernet advertise_network_1 RIP frame 600 includes a destination address having a destination network number 2 and a destination node address f (i.e., broadcast address). The source address data of the IPX header 604 also includes a source network number 2, and a source node address s (i.e., for server 500).

Figure 6B:
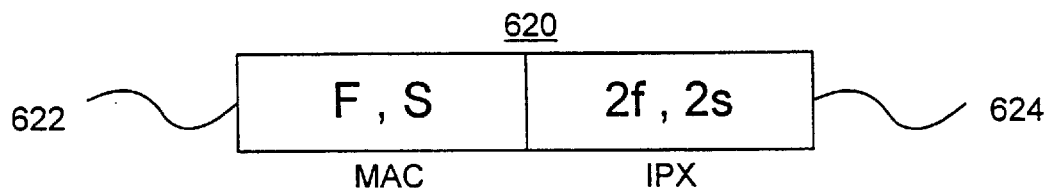
Figure 6C:
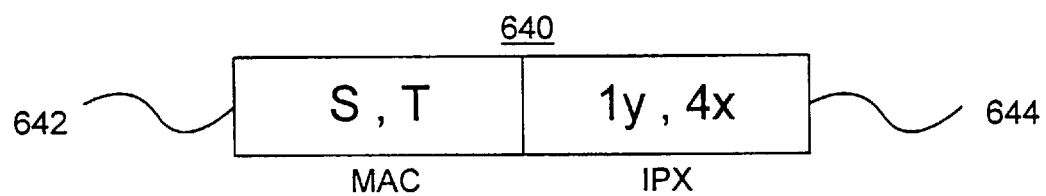
Figure 6D:
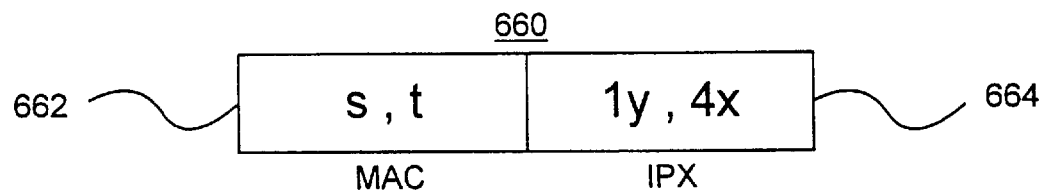

The Ethernet advertise_network_1 RIP frame 600 is switched onto a FDDI medium to produce a FDDI advertise_network_1 RIP frame 620 (see FIG. 6B). In accordance with LAN mixed media switching rules, the MAC header 622 represents a bit-swapped version of the MAC header 602. The IPX header 624 is unchanged. Upon receiving the FDDI advertise_network_1 RIP frame 620, the server 506 builds a RIP table entry for network 508 as: "send any messages bound for network_1 on the interface to network_2 through server/router s."

Where the server 506 is to route a message received over network 510, the message can have an IPX header designation (1y, 4x). That is, a destination network number 1, a destination node address of y, a source network number 4, and a source node number x. FIG. 6C depicts a frame 640 built in response to receipt of such a message. In accordance with Novell IPX FDDI routing rules, a MAC header 642 has a noncanonical format and includes a destination address, S, for the server 500 and a source address, T, corresponding to server 506. The IPX header 644 comprises the IPX header 1y and 4x from the incoming message. The frame 640 is switched over to an Ethernet format to produce frame 660 which is depicted in FIG. 6D. In accordance with LAN switching rules, the MAC header 642 is bit-swapped from a noncanonical to a canonical representation to form MAC header 662. The canonical destination address, s, in the MAC header 662 is recognized as the address for the server 500. When the same scenario takes place in a situation where the server 500 is Ethernet (or FDDI) and the server 506 is Token ring, a problematic result occurs. This scenario is described below with respect to FIGS. 7A through 7D.

Figure 7A:
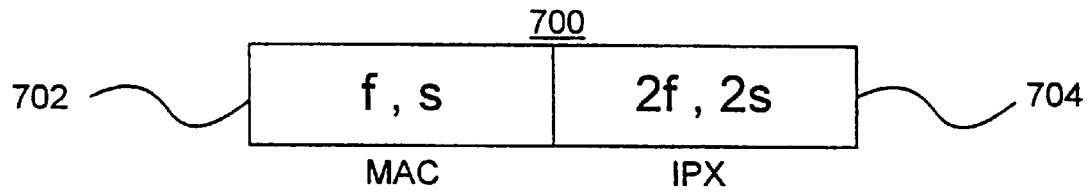
FIGS. 7A through 7D show a succession of frames between an Ethernet client and a Token ring server in a RIP scenario in the FIG. 5 arrangement.
Figure 7B:
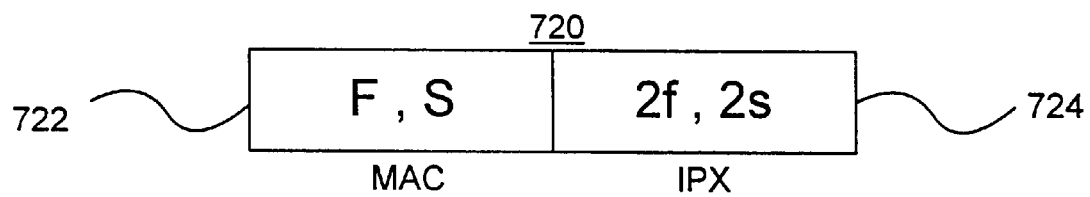

Referring to FIG. 7A, the server 500 generates an Ethernet advertise_network_1 RIP frame 700 advertising network 508 that is switched (by switch 504) over network 502 to server 506. Because the frame 700 is being switched between different media, the MAC header 702 is bit-swapped by the switch 504 whereby a Token ring advertise_ network_1 RIP frame 720 is produced. Upon receiving the Token ring frame 720, the Token ring server 506 builds a RIP table entry for network 508 as: "send any messages bound for network_1 on the interface to network_2 through server/router s." A Token ring server has an expectation that the IPX header address is noncanonical. This information is thus erroneously stored in the RIP table.

Figure 7C:
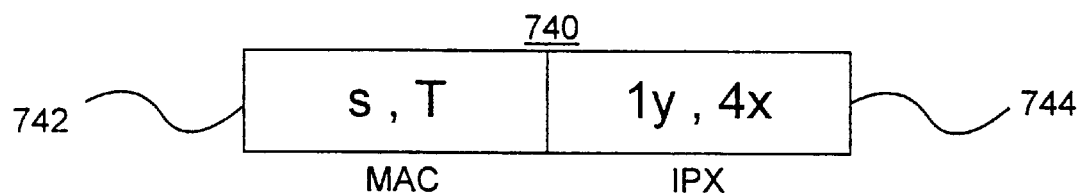
Figure 7D:
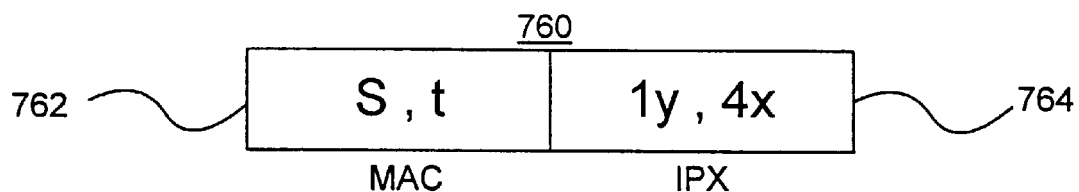

Again, consider the case where server 506 is to route a message received over network 510 which message has an IPX designation (1y, 4x). FIG. 7C depicts a frame 740 built in response to receipt of such a message. In accordance with Novell IPX Token ring routing rules, a MAC header should include a noncanonical destination address, S, derived from the RIP table entry for the server 500, and a noncanonical source address, T, corresponding to Token ring server 506. But because the RIP table entry is wrong, an erroneous MAC header 742 is produced, while the IPX header 744 simply comprises the IPX header 1y and 4x from the incoming message. The frame 740 is switched over to an Ethernet format to produce frame 760 depicted in FIG. 7D. In accordance with LAN switching rules, the MAC header 742 is bit-swapped to produce MAC header 762 having a noncanonical destination address S. However, the destination address, S, in the MAC header 762 is not recognized as the address for the server 500 because the server 500 only recognizes the canonical representation of the address. Hence, the frame 760 fails to reach the server 500 because the noncanonical address is unknown to server 500. A similar problem occurs when a FDDI client issues a RIP frame that is switched onto a Token ring media.

The problem has been described above with respect to RIP and SAP frame scenarios, wherein a request/response mechanism is used. However, similar problems can arise in any local frame scenario. Some messages are not generated in a request/response situation, but rather are spontaneously generated by a station. For example, watchdog frames can be generated by a Token ring server to determine whether an Ethernet station with whom the Token ring station previously communicated, is still active. In building a watchdog frame, the Token ring server relies completely on its internal RIP tables for addressing the Ethernet station. Consequently, an erroneously recorded address inserted into the MAC header of such a frame can be bit-swapped into an unrecognized representation when the watchdog frame is switched onto the Ethernet.

In accordance with a first exemplary embodiment of the invention, the aforedescribed problems in switching scenarios involving a Token ring media and an Ethernet or FDDI media are corrected. A first aspect of a solution in accordance with the invention is the recognition of local components of frames, such as SAP, RIP, and watchdog frames, that are susceptible to the aforedescribed IPX switching problems. Once identified, a second aspect of the solution of the invention is to format frames to conform to expectations of a Network layer station on the media to which the frame is being switched.

An exemplary technique for recognizing local components of frames in accordance with the first exemplary embodiment involves comparing a source address in a MAC header with a source node address in an IPX header; and/or comparing a destination address in a MAC header with a destination node address in an IPX header. If there is an address match in the MACsource/IPX-source pair and/or the MAC-destination/IPX-destination pair, the communicating entity associated with the component is local to the LAN. A first exemplary correction technique then takes appropriate measures to ensure that the local component address formats are proper for the media onto which the frame is being switched. That is, the address formats are converted to a proper canonical or noncanonical representation in accordance with an associated rule corresponding to a CSMA/CD, FDDI or Token ring media. It is noted that the comparison finds an address match regardless of the canonical or noncanonical format of the addresses. For example, if a source address in a MAC header is in a canonical format and the same address is in a noncanonical format in the source node address of the IPX header, the frame is still recognized as having a local component.

Figure 9A:
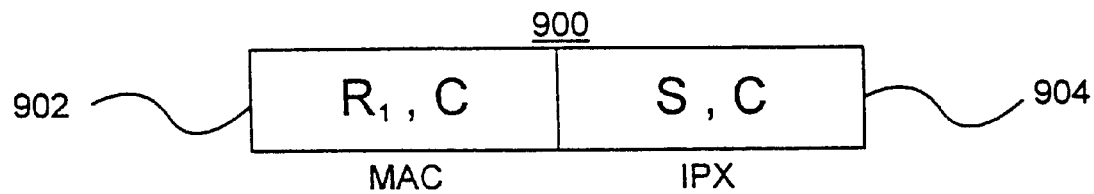
FIGS. 9A through 9C show a succession of frames representing address manipulation in a frame transmitted in the FIG. 8 arrangement.
Figure 9B:
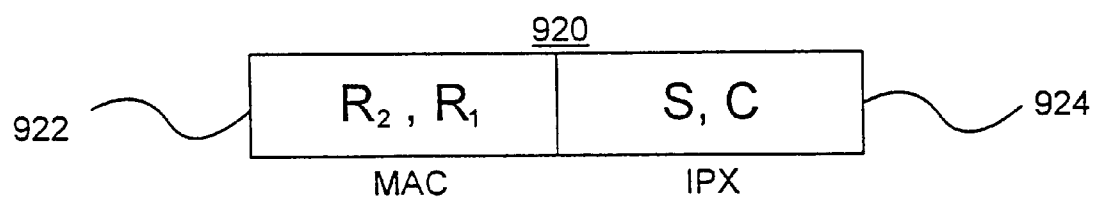
Figure 9C:
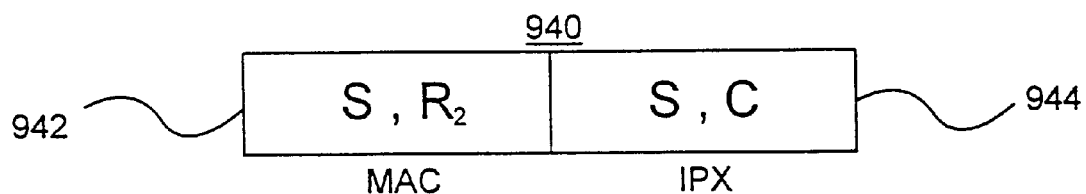

Consider first an example where an IPX frame is sent from the client 800 to the server 814. At each switch, a determination is made whether an incoming frame has local components. FIGS. 9A through 9C depict the transformation of a frame originated by the client 800 and destined for the server 814. Referring to FIG. 9A, frame 900 originates at the client 800 and traverses the first link 802 by means of switch 816 to reach the first router 804. Frame 900 includes a MAC header 902 having a destination address $R_1$ corresponding to the first router 804 and a source address C that corresponds to the client 800. The IPX header 904 has a destination address S corresponding to the server 814 and a source address C that corresponds to the client 800. The switch 816, upon receiving the frame 900, performs a comparison between the source address of the MAC header 902 (i.e., C) and the source node address of the IPX header 904 (i.e., C). The switch 816 also performs a comparison between the destination address of the MAC header 902 (i.e., $R_1$) and the destination node address of the IPX header 904 (i.e., S). Because there is a match between the source address of the MAC header 902 and the source node address of the IPX header 904, the source components of frame 900 are recognized as local. Because the frame is local, appropriate measures are taken to convert those components of the frame into a proper format for the media onto which the frame is being relayed in accordance with frame construction rules.

A frame 920 generated by the first router 804 in response to receipt of the frame 900 is shown in FIG. 9B. The frame MAC header 922 contents are adjusted in accordance with IPX RIP tables included within the first router 804. Referring to FIG. 9B, frame 920 includes a MAC header 922 having a destination address $R_2$ corresponding to the second router 804, and a source address $R_1$ that corresponds to the first router 804. The IPX header 924 is unchanged. The switch 808, upon receiving the frame 920, performs a comparison between the destination address of the MAC header 922 (i.e., $R_2$) and the destination node address of the IPX header 914 (i.e., S). The switch 808 also performs a comparison between the source address of the MAC header 922 (i.e, $R_1$) and the source node address of the IPX header 924 (i.e., C). Because there is no match, the switch simply bit-swaps the MAC header, if required, in accordance with LAN switching rules.

A frame 940 generated by the second router 810 in response to receipt of the frame 920 is shown in FIG. 9C. The frame MAC header 942 contents are adjusted in accordance with IPX RIP tables included within the second router 810. Referring to FIG. 9C, frame 940 contains a MAC header 942 having a destination address, S, corresponding to the server 814, and a MAC header source address $R_2$ that corresponds to the second router 810. The IPX header 944 is unchanged. The switch 818, upon receiving the frame 940, performs a comparison between the destination address of the MAC header 942 (i.e., S) and the destination node address of the IPX header 944 (i.e., S). The switch 818 also performs a comparison between the source address of the MAC header 942 (i.e, $R_2$) and the source node address of the IPX header 944 (i.e., C). Because there is a match between the destination address of the MAC header 942 and the destination node address of the IPX header 944, the frame 900 is recognized as having a local destination component. Accordingly, appropriate measures are taken to ensure that the address formats of those components are proper for the media onto which the frame is being switched.

As discussed above, when a local component is identified, a first exemplary frame correction technique in accordance with the invention converts those components of the frame into the correct format for a media onto which the frame is being switched. More specifically, if a local frame is detected, the following frame construction rules are invoked:

1. Ethernet frames are to have canonical address representations in both the MAC and IPX headers.
2. Fiber Distributed Data Interface (FDDI) frames are to have noncanonical addresses in a MAC header and a canonical address representation in an IPX header.
3. Token ring frames are to have noncanonical address representations in both a MAC and an IPX header.

In accordance with the first exemplary correction technique, when a local component is identified, the switch converts those components of the frame into a proper format for a media onto which the frame is being switched by bit-swapping the source node address in the IPX header of the frame if either the source media is Token ring and the destination media is CSMA/CD or FDDI; or if the source media is CSMA/CD or FDDI and the destination media is Token ring. The MAC header is also bit-swapped, if required by the governing LAN standard.

The problem described above with respect to FIG. 2 and FIGS. 4A through 4D, wherein an Ethernet SAP request frame is replied to by a Token ring server, is solved by the first exemplary solution in accordance with the invention. The first exemplary solution in such a situation is illustrated with respect to FIGS. 10A through 10D.

Figure 10A:
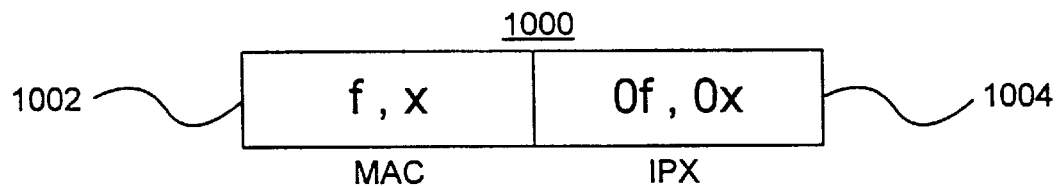
FIGS. 10A through 10D show a succession of frames between an Ethernet client and a Token ring server in a SAP request/reply scenario in the FIG. 2 arrangement incorporating a first exemplary embodiment of the invention.

The FIG. 2 switch 202, upon receiving a Ethernet get_nearest_server frame 1000 of FIG. 10A compares the destination addresses between the MAC and IPX headers, 1002 and 1004, and compares the source addresses between the MAC and IPX headers, 1002 and 1004. In both cases a match occurs, and, in accordance with the first exemplary solution, the switch converts the frame in accordance with the requirements of a Token ring media onto which the frame is being switched. That is, the frame is converted to have noncanonical address representations in both the MAC and IPX headers.

Figure 10B:
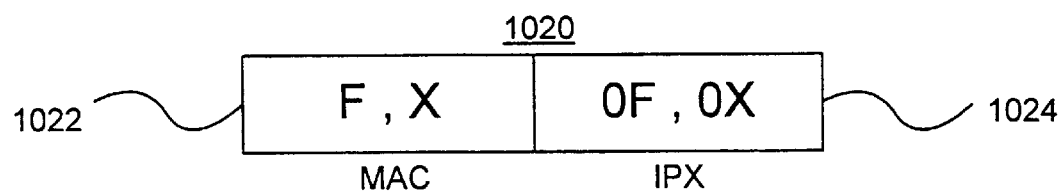
Figure 10C:
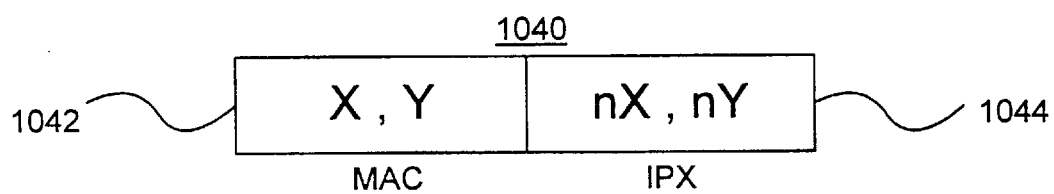

The frame 1020 generated by the switch 202 in accordance with this rule is shown in FIG. 10B. The frame 1020 is received by the Token ring server 204 which, in turn, generates a reply frame 1040 depicted in FIG. 10C. The nearest_server reply frame 1040, generated by the server 204, comprises a MAC header 1042 whose destination address, X, is derived from the source node address of the Token ring IPX header 1024. The MAC header 1042 server source address, Y, is inserted to inform the client 200 of the address of the server 204. The IPX header 1044 comprises a destination node address that is derived from the source node address X of the IPX header 1024 in the request frame 1020. The source node address, Y, for the server 204 is given in noncanonical form in accordance with Token ring reply rules.

Figure 10D:
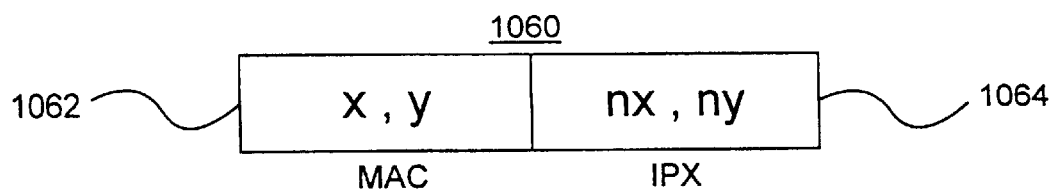

When frame 1040 is received by the switch 202, the switch 202 compares the destination addresses between the MAC and IPX headers, 1042 and 1044, and compares the source addresses between the MAC and IPX headers, 1042 and 1044. In both cases a match occurs, and, in accordance with the first exemplary frame correction technique, the switch converts the frame in accordance with the requirements of the Ethernet media onto which the frame is being switched. That is, the frame is converted to have canonical address representations in both the MAC and IPX headers. The frame 1060 generated by the switch 202 in accordance with this rule is shown in FIG. 10D. When this frame is received at the client 200, the canonical destination address, x, in the MAC header 1062 is recognized. Prior to the aforedescribed solution, the switch 202 would have only bit-swapped the IPX, rendering the MAC header destination address unrecognizable to the client 200.

Use of the first exemplary embodiment in a RIP frame scenario (analogous to the one depicted in reference to FIG. 5 and FIGS. 7A–7D) is shown in FIGS. 11A through 11D. Consider the case where the FIG. 5 server 500 generates an Ethernet advertise_network_1 RIP frame 1100 advertising network 508 which frame is switched (by switch 504) over network 502 to server 506.

Figure 11A:
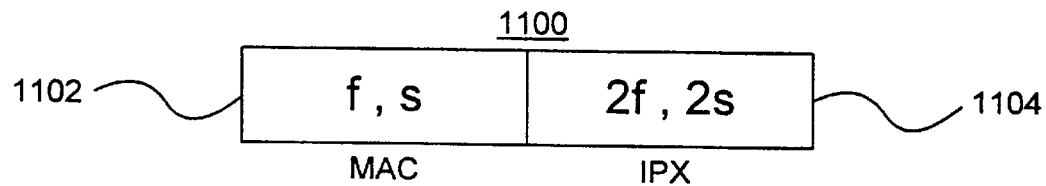
FIGS. 11A through 11D show a succession of frames between an Ethernet client and a Token ring server in a RIP scenario in the FIG. 5 arrangement incorporating a first exemplary embodiment of the invention.

In accordance with the first exemplary technique for recognizing local components of frames, the switch 504, when receiving the FIG. 11A frame 1100, compares the destination addresses between the MAC and IPX headers, 1102 and 1104, and compares the source addresses between the MAC and IPX headers, 1102 and 1104. In both cases a match occurs, and the switch converts the frame 1100 in accordance with the requirements of a Token ring media onto which the frame is being switched. That is, the frame is converted to have noncanonical address representations in both the MAC and IPX headers.

Figure 11B:
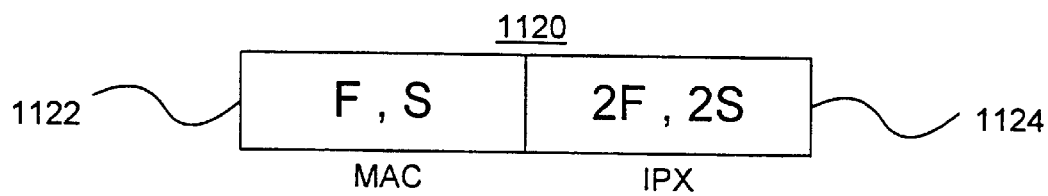

The frame 1120 generated by the switch 504 in accordance with this rule is shown in FIG. 11B. Upon receiving the frame 1120, the Token ring server 506 will build a RIP table entry for network 508 as: "send any messages bound for network_1 on the interface to network_2 through server/router S." Thus the integrity of the RIP table is preserved.

Now consider the case where the FIG. 5 server 506 is to route a message received over network 510 which message has an IPX designation (1y, 4x). That is, a destination network number_1, a destination node address of y, a source network number_4, and a source node number x.

Figure 11C:
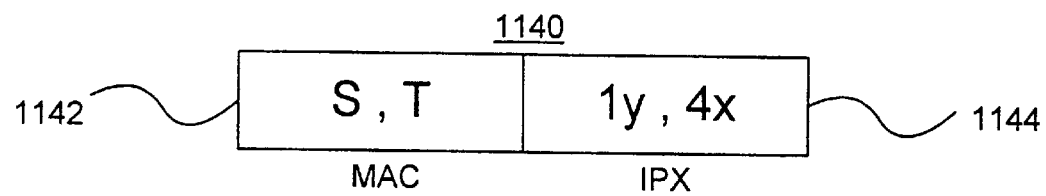
Figure 11D:
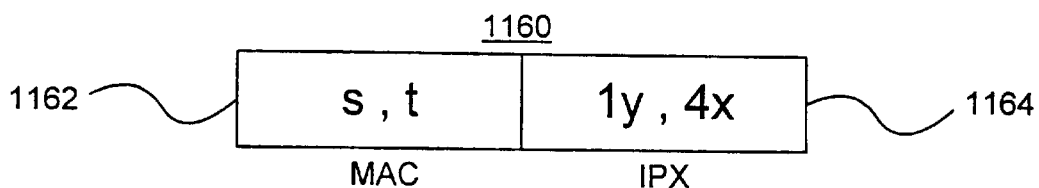

FIG. 11C depicts a frame 1140 built in response to the received message. In accordance with Novell IPX Token ring routing rules, a MAC header 1142 includes a noncanonical destination address, S, for the server 500, derived from the RIP table entry, and a noncanonical source address, T, corresponding to server 506. The IPX header 1144 comprises the IPX header 1y and 4x from the incoming message. The frame 1140 is received by the switch 504. A comparison of the destination addresses in the MAC and IPX headers, and a comparison of the source addresses in the MAC and IPX headers reveals no matches. Accordingly, in accordance with LAN switching rules, the MAC header 1142 is simply bit-swapped to produce the FIG. 11D frame 1160. As a result of the bit-swap, a canonical destination address, s, appears in the MAC header 1162, which address is recognized by the server 500. Hence, the frame 1160 successfully reaches the server 500. A similar result occurs when applying the aforementioned solution in a FDDI-Token ring interworking media environment.

In a second exemplary embodiment of the invention, the client identifier of a Dynamic Host Configuration Protocol (DHCP) frame which is subject to violating expectations of a Network layer station implementing IP protocol is checked for local components and modified to conform with expectations, if required. IP protocol dictates a bit order for MAC addresses when they are stored in the body of a DHCP frame. The required bit order is dependent on the physical media on which the frame is to be transmitted or received. In a frame to be transmitted or received on IEEE 802.3 CSMA/CD or ASNI X3T9.5 FDDI LANs, IP dictates that the address be encoded canonically in the DHCP message. In a frame to be transmitted on IEEE 802.5 Token ring LANs, IP dictates that the address be encoded noncanonically.

Taken together, the LAN standards and the IP protocol dictates, therefore, that a station implementing IP protocol can have the following expectations of media addresses of local stations encoded in a received DHCP frame, and similarly will generate such frames which conform to these expectations (although these expectations do not apply to all frames on the media at all times):

On IEEE 802.3 CSMA/CD, media addresses are canonical in both MAC header and a DHCP message field.

On IEEE 802.5 Token ring, media addresses are noncanonical in both MAC header and a DHCP message field.

On ANSI X3T9.5 CSMA/CD FDDI, media addresses are noncanonical in the MAC header and canonical in a DHCP message field.

In a second exemplary embodiment of the invention, a second exemplary technique for recognizing local frame components is applied to DHCP frames. Referring to FIG. 12A, a DHCP frame is shown. Frame 1200 includes a MAC header 1202. The format, content and encoding of this header is subject to the LAN standard appropriate to the medium on which the frame is to be transmitted or received. The MAC header 1202 includes at least a source and destination MAC address which is subject to the appropriate LAN standard.

The rest of the frame includes an IP header 1204, a UDP header 1206 and a DHCP message 1208. The IP header 1204 includes IP protocol data which corresponds to the Network layer concerned with internetworking. The IP header 1204 includes destination and source station identifiers as well as task identifiers. The UDP header 1206 includes a destination socket number. The DHCP message 1208 includes a client identifier.

FIG. 12B shows the details of address fields 1250 in an DHCP frame 1200. In the MAC header field 1252, there is a destination address D, and a source address S. In the IP header field 1254, there is a destination entity address DEST and a source entity address SRC. UDP header field 1256 includes a destination socket identifier SN. DHCP message field 1258 includes a client identifier CHADDR.

In accordance with an exemplary technique for recognizing local components of frames in accordance with a second exemplary embodiment of the invention, the destination socket ID SN is investigated to identify the presence of a client identifier CHADDR in the DHCP message of frame 1250. If the socket number is not "67" or "68", there is no client identifier. If the socket number is set to "67" a comparison is made between the source address of the MAC header (i.e., S) and the client identifier of the DHCP message (i.e., CHADDR). If the socket ID is set to "68", a comparison between the destination address of the MAC header (i.e., D) and the address of the DHCP header is performed. If either comparison results in a match, the frame is local. Again, it must be stressed that the comparison finds an address match regardless of the bit order of the addresses. Appropriate measures in accordance with a second exemplary frame correction technique are then taken to ensure that the local component address formats are proper for the media onto which the frame is being switched. That is, the address formats are converted to a proper canonical or noncanonical representation in accordance with an associated rule corresponding to a CSMA/CD, FDDI or Token ring media.

When a local component is identified, the second exemplary embodiment invokes the following rules to convert the local components of a frame to the proper format for the media onto which the frame is being transferred:

1. Ethernet frames are to have canonical address representations in both the MAC header and DHCP message of the DHCP frame.
2. Fiber Distributed Data Interface (FDDI) frames are to have noncanonical addresses in a MAC header and a canonical address representation in the DHCP message of the DHCP frame.
3. Token ring frames are to have noncanonical address representations in both a MAC header and the DHCP message of the DHCP frame.

In accordance with the second exemplary correction technique, when a local component is identified, the switch converts those components of the frame into a proper format for a media onto which the frame is being switched by bit-swapping the client identifier encoded in the DHCP message if either the source media is Token ring and the destination media is CSMA/CD or FDDI; or if the source media is CSMA/CD or FDDI and the destination media is Token ring. The MAC header is also bit-swapped, if required by the governing LAN standard.

Figure 13:
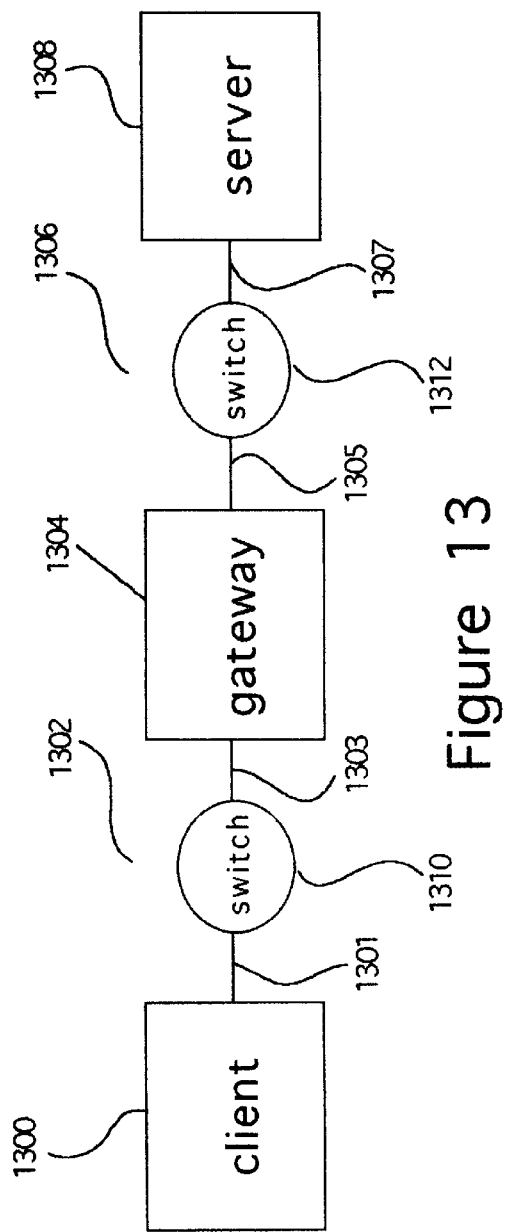
FIG. 13 shows an arrangement by which a client communicates with a server through a gateway.
Figure 15A:
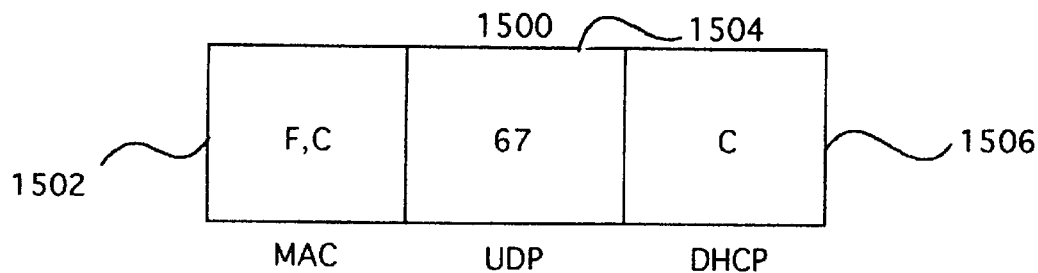
FIGS. 15A through 15D show a succession of DHCP frames between a client and a server in a request/reply scenario in the FIG. 13 arrangement incorporating a second exemplary embodiment of the invention.

An example in accordance with a second embodiment of the invention is presented in the frame transformation exhibited in FIGS. 15A through D. FIGS. 15A through D depict the transformation of a frame originated by the FIG. 13 client 1300 and destined for the server 1308 through gateway 1304. Referring to FIG. 15A, frame 1500 originates at the client 1300 and traverses the first link 1301 by means of switch 1310. Frame 1500 includes a MAC header 1502 having a destination address F (i.e., broadcast) and a source address C that corresponds to the client 1300. The UDP header 1504 has a socket ID set to "67". The DHCP message 1506 has a client ID, C, which is the address of client 1300. The switch 1310, upon receiving the frame 1500, checks the UDP header1504 to see if the socket number is set to "67" or "68". Since the socket number is set to "67" the switch 1310 performs a comparison between the source address of the MAC header 1502 (i.e., C) and the address of the DHCP header 1504 (i.e., C). Because there is a match the frame is recognized as local. Appropriate measures are taken, in accordance with the second exemplary frame correction technique, to ensure that the local component address formats are proper for the media onto which the frame is being switched.

Figure 15B:
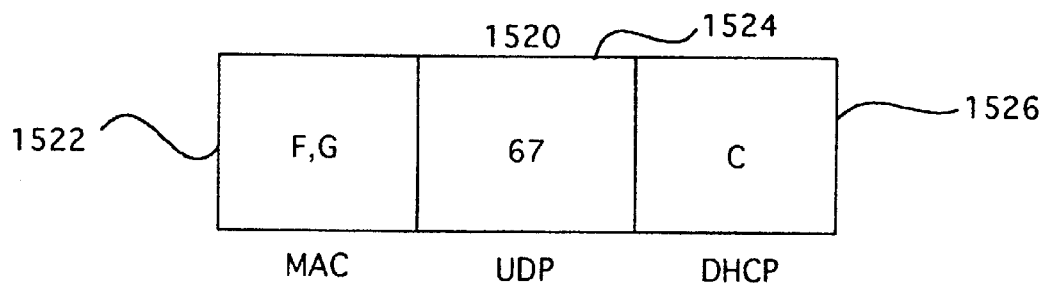

A frame generated by gateway 1304 in response to receipt of the frame 1500 is shown in FIG. 15B. The frame MAC header 1522 contents are adjusted by gateway 1304. Particularly, frame 1520 includes a MAC header 1522 having a source address G corresponding to gateway 1304. Destination address, F, remains broadcast. The DHCP message field 1526 also remains unchanged, except for any necessary change in bit-ordering made by switch 1310.

Switch 1312, upon receiving the frame 1520, checks the UDP header field 1524 to see if the socket number is set to "67" or "68". Since the socket number is set to "67" switch 1312 performs a comparison between the source address of the MAC header 1522 (i.e., G) and the address of the DHCP message 1526 (i.e., C). Because there is no match, the frame is not recognized as having local components. The switch 1312 simply bit-swaps the MAC header, if required, in accordance with LAN switching rules.

Figure 15C:
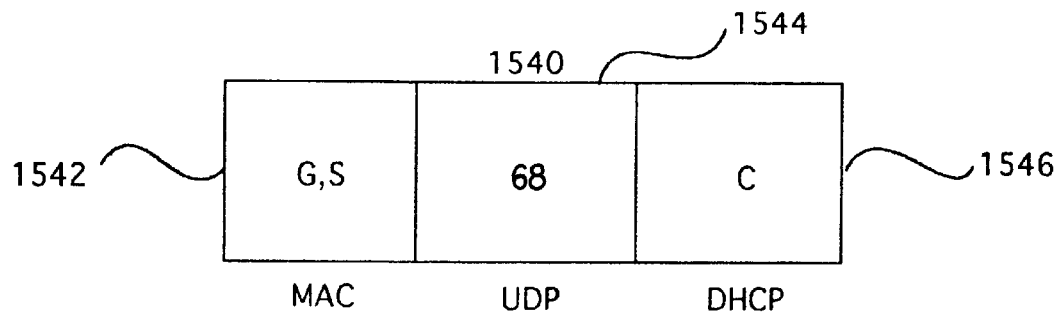

A frame 1540 generated by server 1308 in response to receipt of the frame 1520 is shown in FIG. 15C. The frame MAC header 1542 addresses is adjusted by the server 1308.

Figure 15D:
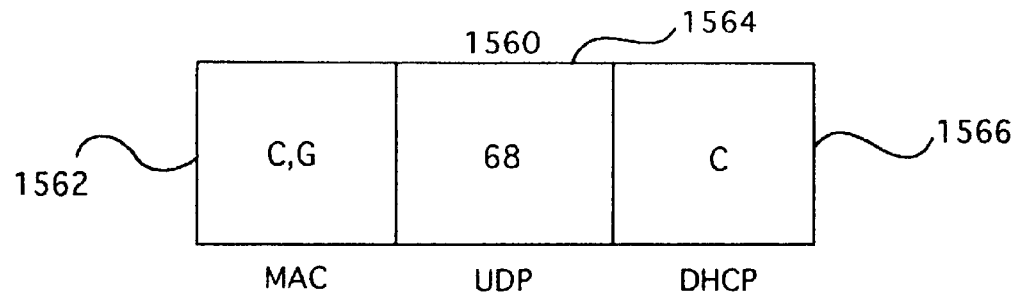

Referring to FIG. 15D, frame 1540 includes a MAC header 1542 having a destination address G corresponding to the gateway 1304, and a source address S that corresponds to the server 1308. The UDP header 1544 is changed to "68". The DHCP message 1546 is unchanged. The switch 1312, upon receiving the frame 1540, first checks the UDP header 1546 to see if the socket ID is set to "67" or "68". Since the socket number is set to "68" the switch 1310 performs a comparison between the destination address of the MAC header 1542 (i.e., G) and the address of the DHCP message 1546 (i.e., C). Because there is no match, the frame is not recognized as having local components. The switch 1312 simply bit-swaps the MAC header, if required, in accordance with LAN switching rules.

Upon receipt of frame 1540 from switch 1312, gateway 1304 generates frame 1560. Frame 1560 includes a MAC header 1562 having a destination address C corresponding to client 1300 and a source address G that corresponds to gateway 1304. UDP header 1564 socket ID remains "68". The DHCP message 1566 retains a client ID, C, which is the address of client 1300. The switch 1310, upon receiving the frame 1560, checks the UDP header to see if the socket number is set to "67" or "68". Since the socket number is set to "68" the switch 1310 performs a comparison between the destination address of the MAC header 1562 (i.e., C) and the address of the DHCP message 1564 (i.e., C). Because there is a match the frame is recognized as local. Appropriate measures are taken in accordance with the second exemplary frame correction technique to ensure that the local component address formats are proper for the media onto which the frame is being switched. That is, the address formats are converted to a proper canonical or noncanonical representation in accordance with an associated rule corresponding to a CSMA/CD, FDDI or Token ring media.

Figure 14:
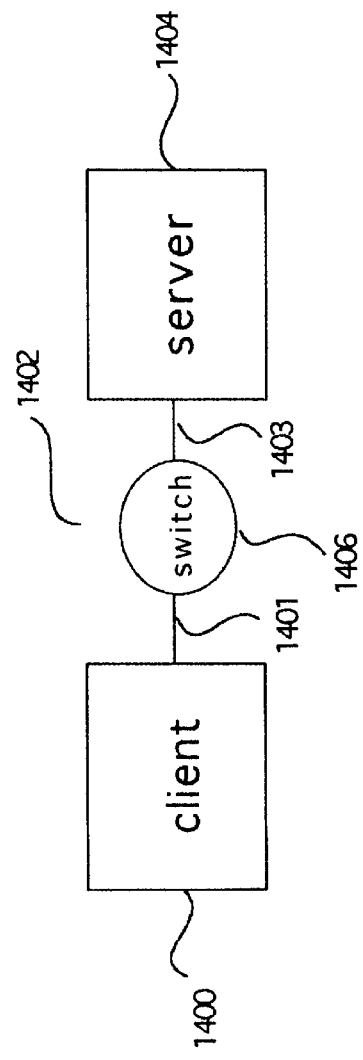
FIG. 14 shows an exemplary switching arrangement involving a client and a server.

FIG. 14 depicts a scenario wherein a DHCP frames are switched between a client 1400 and an server 1404. Client 1400 is connected to a switch 1406 by an Token ring link 1401. Switch communicates with a server 1404 over a Ethernet link 1403.

Figure 16A:
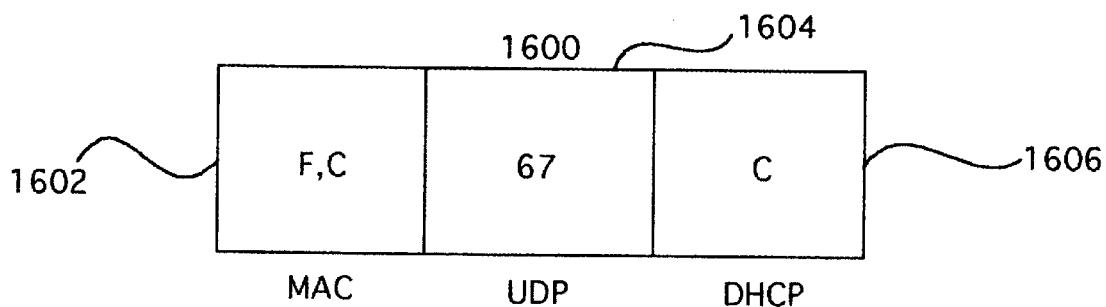
FIGS. 16A and 16B show a succession of DHCP frames between an Ethernet client and a token ring server in the FIG. 14 arrangement incorporating a second exemplary embodiment of the invention.
Figure 16B:
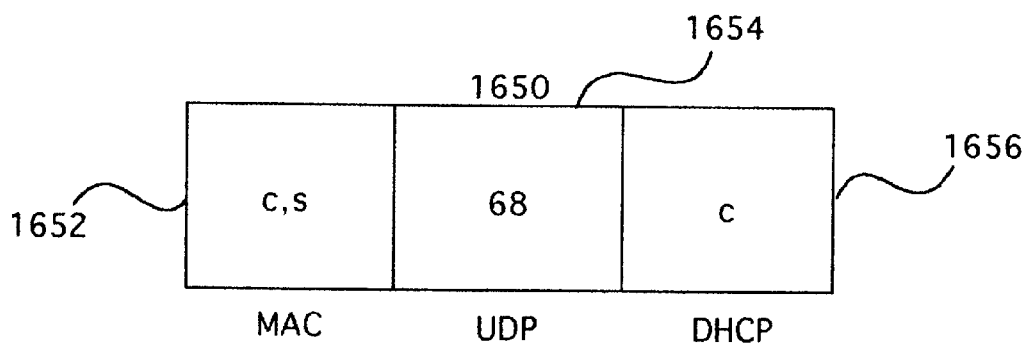

FIGS. 16A and 16B depict the transformation of a frame originated by the client 1400 and destined for the server 1404. Referring to FIG. 16A, frame 1600 originates at the client 1400 and traverses the first link 1401 by means of switch 1406. Frame 1600 includes a MAC header 1602. Encoded in MAC header 1602 is a broadcast destination MAC address F and a source MAC address C corresponding to client 1400. The UDP header 1604 has a socket ID value of "67" identifing the frame 1600 as having a client identifier in the DHCP message field 1606.

The switch 1406, upon receiving the frame 1600, identifies the socket ID contained in the UDP header address field 1604. Because the socket ID has a value of "67", the switch 1406 performs a comparison between the source address of the MAC header field 1602 (i.e., C) and the address of the DHCP header 1604 (i.e., C). Because there is a match, the frame is recognized as local and appropriate measures are taken in accordance with the second exemplary frame construction technique to ensure that the local component address formats are proper for the Ethernet media onto which the frame is being switched.

A frame 1650 generated by Ethernet server 1404 in response to receipt of the frame 1600 is shown in FIG. 16B. The frame destination MAC header 1652 has a destination address c corresponding to the client 1400, and a source address s that corresponds to server 1404. The frame has a UDP header 1654 with a socket ID set to "68". The client identifier in the DHCP message is changed only in the bit ordering (i.e., c).

The switch 1406, upon receiving the frame 1650, first checks the UDP header 1652 to see if the socket number is set to "67" or "68". Since the socket number is set to "68" the switch 1406 performs a comparison between the destination address of the MAC header 1652 (i.e., c) and the address of the DHCP header 1656 (i.e., c). Because there is a match, the switch 1406 the frame is recognized as local and appropriate measures are then taken, in accordance with the second exemplary frame correction technique, to ensure that the local component address formats are proper for the Token ring media onto which the frame is being switched.

Analogous recognition and frame correction techniques can be applied with respect to Token ring clients issuing frames switched onto a FDDI media, or vice versa.

Figure 17:
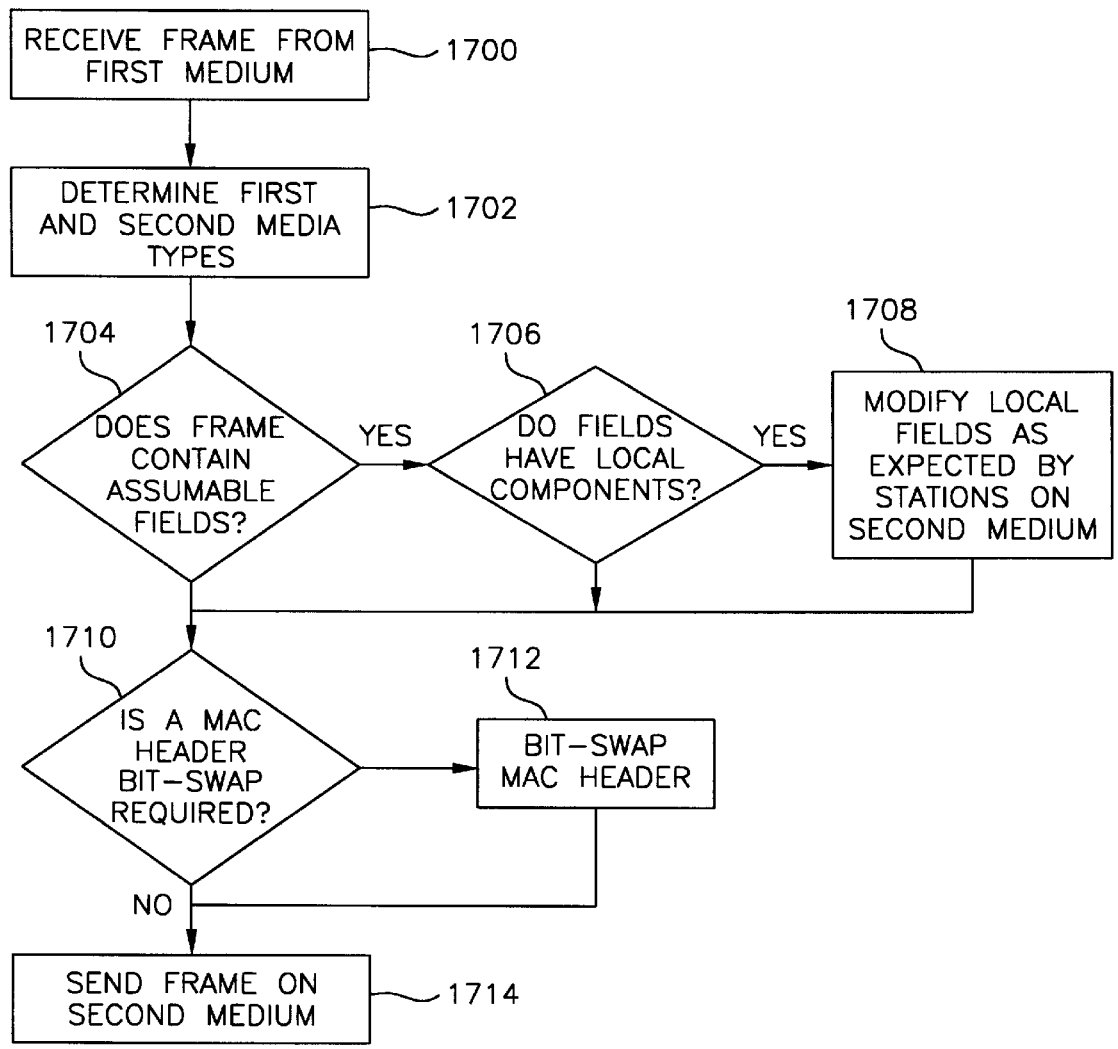
FIG. 17 show a flow diagram of a method for detecting "local" components in a received frame in accordance with exemplary embodiments of the invention.

FIG. 17 depicts an exemplary flow diagram which summarizes solutions in accordance with exemplary embodiments of the invention. When a frame is received at Step 1700, the frame is checked at Step 1702 to determine the media type from which the frame is received and onto which the frame will be transferred. The frame is then checked at Step 1704 for assumable fields, i.e., address fields about which a Network layer stations may expect a certain relationship with the mac header. At Step 1706, assumable fields are compared with corresponding MAC header fields to determine if the fields contain local components. If so, at Step 1708, the local fields components in the assumable fields are formatted as expected by stations on the second medium. At Step 1710 and 1712, the MAC header is then bit-swapped, if required, after which the frame is sent out to the second medium at Step 1714. If there are no assumable fields, or if the assumable fields do not have local components, the MAC header of the frame is simply bit swapped, if required, in accordance with LAN switching rules at Step 1710 and 1712, after which the frame is sent out at Step 1714.

Those skilled in the art will appreciate that any of the solutions for identifying local frames and any of the aforementioned solutions for correcting address formats in such frames can be combined for situations where either the source media is Token ring and the destination media is CSMA/CD or FDDI, or if the source media is CSMA/CD or FDDI and the destination media is Token ring.

It will also be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for switching frames between a medium operating according to a first protocol and a medium operating according to a second protocol, the method comprising the steps of: receiving a frame; determining whether a first address in the frame is a local address, including comparing a second address in the frame with the first address, wherein the second address is a Data Link layer address and the first address is not a Data Link layer address; and formatting the first address in accordance with expectations of a station on the medium onto which the frame is being switched if the first address is determined to be a local address.

2. The method of claim 1 wherein the step of determining if the first address is a local address comprises the step of: comparing a source address in a media access control (MAC) header of the frame with a source node address in an Internet Packet Exchange (IPX) header of the frame, wherein a match in the comparison identifies the first address as a local address.

3. The method of claim 1 wherein the step of determining if the first address is a local address comprises the step of: comparing a destination address in a MAC header of the frame with a destination node address in an IPX header of the frame, wherein a match in the comparison identifies the first address as a local address.

4. The method of claim 1 wherein the step of formatting the first address, in the case where the second protocol is Token ring, comprises the steps of: converting an address in an IPX header of the frame to noncanonical format if not already in noncanonical format.

5. The method of claim 1 wherein the step of formatting the first address, in the case where the second protocol is carrier sense multiple access with collision detection (CSMA/CD), comprises the steps of: converting an address in an IPX header of the frame to canonical format if not already in canonical format.

6. The method of claim 1 wherein the step of formatting the first address, in the case where the second protocol is fiber distributed data interface (FDDI), comprises the steps of: converting an address in an IPX header of the frame to canonical format if not already in canonical format.

7. The method of claim 1 wherein the step of determining if the first address is a local address comprises the step of: examining a socket number in a User Datagram Protocol (UDP) header of the frame; and comparing a source address in a MAC header of the frame with an address in a Dynamic Host Configuration Protocol (DHCP) message field of the frame, wherein a match in the comparison identifies the first address as a local address.

8. The method of claim 1 wherein the step of determining if the first address is a local address comprises the step of: examining a socket number in a UDP header of the frame; and comparing a destination address in a MAC header of the frame with an address stored in a DHCP message field of the frame, wherein a match in the comparison identifies the first address as a local address.

9. The method of claim 1 wherein the step of formatting the first address, in the case where the second protocol is Token ring, comprises the steps of: converting an address in a DHCP message field of the frame to noncanonical format if not already in noncanonical format.

10. The method of claim 1 wherein the step of formatting the first address, in the case where the second protocol is CSMA/CD, comprises the steps of: converting an address in a DHCP message field of the frame to canonical format if not already in canonical format.

11. The method of claim 1 wherein the step of formatting the first address, in the second protocol is FDDI, comprises the steps of: converting an address in a DHCP message field of the frame to canonical format if not already in canonical format.

12. The method of claim 1, wherein the step of determining whether the first address is a local address comprises identifying the first and second protocols according to which the media are operating.

13. An apparatus for switching frames between a medium operating according to a first protocol and a medium operating according to a second protocol, the apparatus comprising: means for receiving a frame; means for determining whether a first address in the frame is a local address, including comparing a second address in the frame with the first address, wherein the second address is a Data Link layer address and the first address is not a Data Link layer address;

and means for formatting the first address in accordance with expectations of a station on the medium onto which the frame is being switched if the first address is determined to be a local address.

14. The apparatus of claim 13 wherein the means for determining if the first address is a local address compares a source address in a MAC header of the frame with a source node address in an IPX header of the frame, wherein a match identifies the first address as a local address.

15. The apparatus of claim 13 wherein the means for determining if the first address is a local address compares a destination address in a MAC header of the frame with a destination node address in an IPX header of the frame, wherein a match in the comparison identifies the first address as a local address.

16. The apparatus of claim 13 wherein, in the case where the second protocol is Token ring, the means for formatting the first address converts an address in an IPX header of the frame to noncanonical format if not already in noncanonical format.

17. The apparatus of claim 13 wherein, in the case where the second protocol is CSMA/CD, the means for formatting the first address converts an address in an IPX header of the frame to canonical format if not already in canonical format.

18. The apparatus of claim 13 wherein, in the case where the second protocol is FDDI, the means for formatting the first address converts an address in an IPX header of the frame to canonical format if not already in canonical format.

19. The apparatus of claim 13, wherein the means for determining if the first address is a local address comprises: means for examining a socket number carried in a UDP header of the frame; and means for comparing a source address in a MAC header of the frame with an address in a DHCP message field of the frame, wherein a match in the comparison identifies the first address as a local address.

20. The apparatus of claim 13, wherein the means for determining if the first address is a local address comprises: means for examining a socket number carried in a UDP header of the frame; and means for comparing a destination address in a MAC header of the frame with an address in a DHCP message field of the frame, wherein a match in the comparison identifies the first address as a local address.

21. The apparatus of claim 13, wherein the means for determining whether the second address is a local address comprises identifying the first and second protocols according to which the media are operating.

22. A method for switching frames between a medium operating according to a first protocol and a medium operating according to a second protocol, wherein the first and second protocols are different, the method comprising the steps of: receiving a frame; comparing a Data Link layer address in the frame with a Network layer address in the frame for a match; and formatting the Network layer address in accordance with expectations of a station on the medium onto which the frame is being switched.

23. The method of claim 22 wherein the first layer is the Data Link layer and the second layer is the Network layer.

24. The method of claim 22 wherein the comparing step comprises: comparing a source address in a MAC header of the frame with a source node address in an IPX header of the frame.

25. The method of claim 22 wherein the comparing step comprises: comparing a destination address in a MAC header of the frame with a destination node address in an IPX header of the frame.

26. The method of claim 22 wherein the formatting step, in the case where the second protocol is Token ring, comprises converting the Network layer address to noncanonical format if not already in noncanonical format.

27. The method of claim 22 wherein the formatting step, in the case where the second protocol is CSMA/CD, comprises converting the Network layer address to canonical format if not already in canonical format.

28. The method of claim 22 wherein the formatting step, in the case where the second protocol is FDDI, comprises converting the Network layer address to canonical format if not already in canonical format.

29. The method of claim 22 wherein the comparing step comprises identifying the first and second protocols operating at the first layer.

30. An apparatus for switching frames between a medium operating according to a first protocol and a medium operating according to a second protocol, wherein the first and second protocols are different, the apparatus comprising means for receiving a frame; means for comparing a Data Link layer address in the frame with a Network layer address in the frame for a match; and means for formatting the Network layer address in accordance with expectations of a station on the medium onto which the frame is being switched.

* * * * *